US011776030B2

(12) United States Patent
Desrosiers

(10) Patent No.: US 11,776,030 B2
(45) Date of Patent: Oct. 3, 2023

(54) MANUFACTURES AND METHODS FOR SHOPPER USERS TO LOCATE ITEMS

(71) Applicant: Rejean Desrosiers, Mississuaga, CA (US)

(72) Inventor: Rejean Desrosiers, Mississuaga, CA (US)

(*) Notice: Subject to any disclaimer, the term of this patent is extended or adjusted under 35 U.S.C. 154(b) by 0 days.

(21) Appl. No.: 17/139,696

(22) Filed: Dec. 31, 2020

(65) Prior Publication Data
US 2022/0207581 A1 Jun. 30, 2022

(51) Int. Cl.
*G06Q 30/00* (2023.01)
*G06Q 30/0601* (2023.01)
*H04L 65/611* (2022.01)

(52) U.S. Cl.
CPC ..... *G06Q 30/0611* (2013.01); *G06Q 30/0619* (2013.01); *G06Q 30/0621* (2013.01); *G06Q 30/0639* (2013.01); *G06Q 30/0641* (2013.01); *H04L 65/611* (2022.05)

(58) Field of Classification Search
CPC ...... G06Q 30/0601–0645; G06Q 30/08; H04L 65/4076
USPC ............................................... 705/26.1–27.2
See application file for complete search history.

(56) References Cited

U.S. PATENT DOCUMENTS

| | | | | |
|---|---|---|---|---|
| 10,963,848 B1* | 3/2021 | Anderson | .......... | G06Q 30/0611 |
| 2005/0033650 A1* | 2/2005 | Robertson | .............. | G06Q 30/02 |
| | | | | 705/26.8 |
| 2005/0071239 A1* | 3/2005 | Tormey | .................. | G06Q 30/06 |
| | | | | 705/26.1 |
| 2007/0250428 A1* | 10/2007 | Rabenold | ............... | G06Q 30/08 |
| | | | | 705/37 |
| 2010/0153278 A1* | 6/2010 | Farsedakis | ........... | G06Q 50/188 |
| | | | | 705/80 |
| 2010/0174727 A1* | 7/2010 | Zappacosta | ........ | G06Q 30/0629 |
| | | | | 707/754 |
| 2011/0213673 A1* | 9/2011 | Eydelman | .............. | G06Q 30/08 |
| | | | | 705/26.3 |
| 2014/0316927 A1* | 10/2014 | Ganesan | ................ | G06Q 30/06 |
| | | | | 705/26.4 |
| 2017/0076345 A1* | 3/2017 | Pan | ......................... | H04L 67/22 |
| 2018/0152764 A1* | 5/2018 | Taylor | ................ | G06Q 30/0623 |
| 2019/0043071 A1* | 2/2019 | O'Keeffe | ........... | G06Q 30/0601 |
| 2019/0392512 A1* | 12/2019 | Zagorin | ............... | G06Q 50/188 |
| 2020/0005367 A1* | 1/2020 | Christian-Ezeofor | ...................... | |
| | | | | G06Q 20/3223 |

OTHER PUBLICATIONS

Rubin, Ben Fox, Facebook Marketplace wants to be the new Craigslist, Oct. 3, 2016, Cnet.com, accessed at [https://www.cnet.com/tech/mobile/with-marketplace-facebook-tries-to-become-the-new-craigslist/] (Year: 2016).*

* cited by examiner

*Primary Examiner* — Michael Misiaszek
*Assistant Examiner* — Lindsey B Smith
(74) *Attorney, Agent, or Firm* — Select IP Law Corporation; Ashkon Cyrus

(57) ABSTRACT

The present disclosure allows shopper users to receive offers for items and services without having do use any traditional search engine. According to an embodiment of the present disclosure, the shopper will see different offers for the exact items and those that closely resemble the items the shopper needs as well as services.

9 Claims, 19 Drawing Sheets

MANUFACTURES AND METHODS FOR SHOPPER USERS TO LOCATE ITEMS

TECHNICAL FIELD

This invention relates to reserving goods or services over a computer network. More specifically, this invention relates to locating and purchasing goods or services via a computer network such as the Internet or an intranet.

BACKGROUND OF THE DISCLOSURE

Online shopping is tedious and difficult for users to stay up to date on product availability. The number of online vendors exceeds the amount of time an average person has to go through them all.

The typical shopper has to search through search engines for a product they like, however searching for items across many search engine results or multiple retail sites is laborious. It is difficult to find a wanted item in a simple and efficient manner.

What needed is a simple, fast, and satisfying experience in which a shopper ends up with the products they desire at the best possible prices

SUMMARY OF THE DISCLOSURE

In accordance with preferred embodiments of the present invention, some of the problems associated with comparison shopping are overcome. Methods and systems for shopping interfaces are presented.

According to embodiments of the present disclosure, methods and user interfaces for posting items are provided. A server network device provides to a shopper client network device via a computer network, an option to search for an item.

The present disclosure allows shopper users to directly receive offers for items without having do use any traditional search engine. According to an embodiment of the present disclosure, the shopper will see different offers for the exact items as well as for the ones that closely resemble the items the shopper needs.

Further embodiments of the present disclosure provide for creating a livestream which allows both people wanting to sell their pre-owned products as well as businesses (retailers, service providers, manufacturers, wholesalers, and distributors) to directly control marketing and making sales by allowing people and vendors to build a fully personalized direct livestream of ready to buy shoppers for products and services they sell. In embodiments of the present disclosure, the livestream can be set up and customized for 1 or multiple categories in 1 or multiple cities or states/provinces or countries.

The system and method is like the reverse of a traditional search engines wherein private and commercial sellers search to find the buyers. Thus, sellers have live access to buyers who are ready to buy items and services identical or similar to the ones they sell.
This allows private and commercial sellers to instantly receive shoppers requests the very second they post them and in turn they can send them their best offer directly so they never miss the opportunity to make sales!

BRIEF DESCRIPTION OF THE DRAWINGS

For a more complete understanding of the present disclosure and its advantages, reference is now made to the following description taken in conjunction with the accompanying drawings.

FIG. 2 is a user interface according to an embodiment of the present disclosure illustrating a preview page.

DETAILED DESCRIPTION OF THE DISCLOSURE

Figure 1:
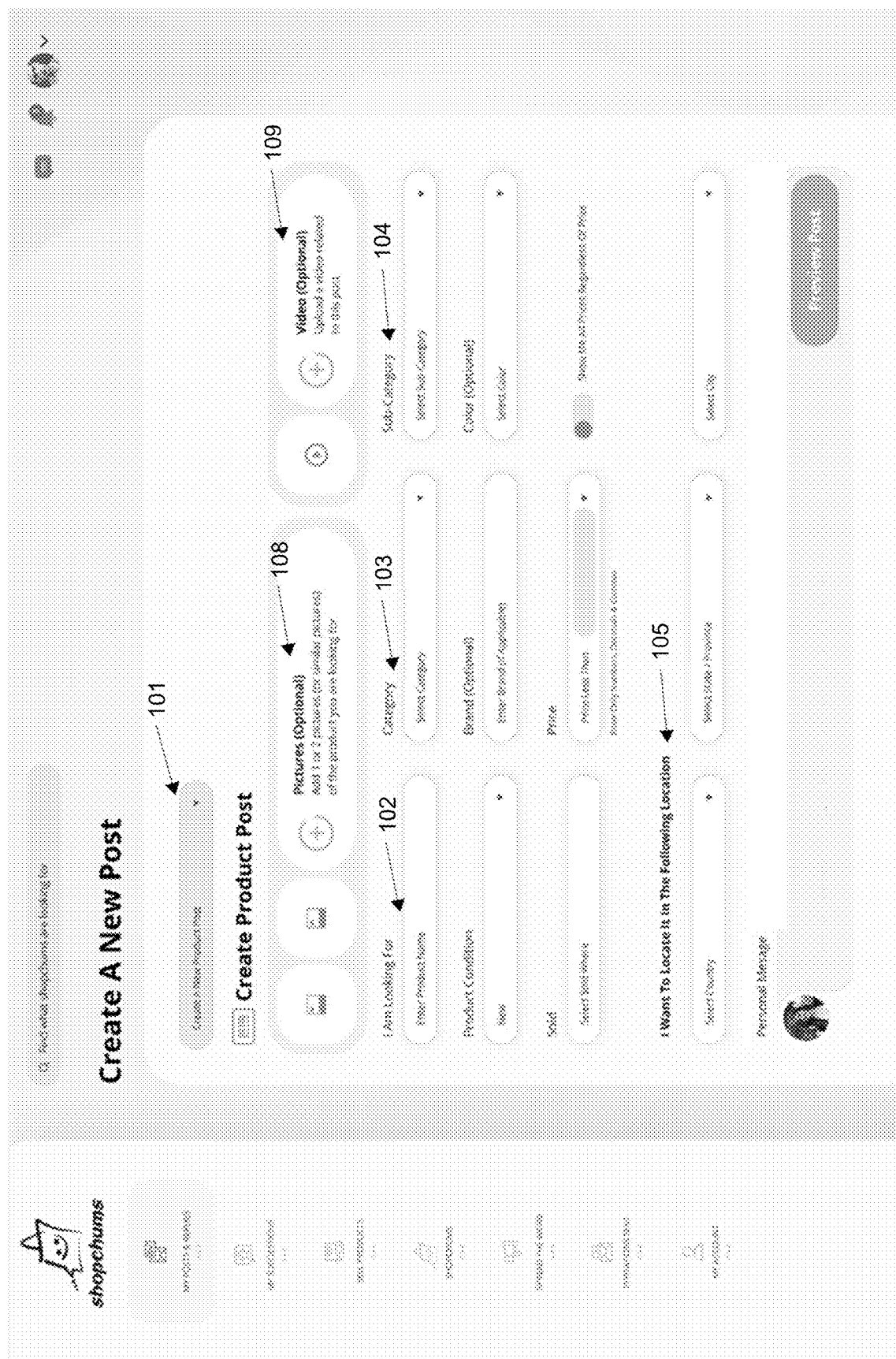
FIG. 1 is a create post user interface according to an embodiment of the present disclosure illustrating a shopping system.

It should be understood at the outset that, although exemplary embodiments are illustrated in the figures and described below, the principles of the present disclosure may be implemented using other techniques. The present disclosure should in no way be explicitly limited to the exemplary implementations and techniques illustrated in the drawings and described below. Additionally, unless otherwise specifically noted, articles depicted in the drawings are not necessarily drawn to scale.

The shopping system includes one or more client network devices. The client network devices include, but are not limited to, personal computers, wireless telephones, personal information devices, personal digital assistants, handheld devices, network appliances, and other types of electronic devices. However, the present invention is not limited to these devices and more, fewer or equivalent types of client electronic devices can also be used. The client network devices can represent shoppers as well as other vendors such as people and businesses, client network devices are in communications with a computer network (e.g., the Internet, intranet, etc.).

FIG. 1 is a user interface according to an embodiment of the present disclosure illustrating a shopping system for connecting shoppers with individual people and businesses selling products or services wanted by the shoppers. The Users of shopping system can create a post that describes a product or a service they are looking for via Create a New Post button 101. According to an embodiment, shopper Users can create both product and service posts. That is, a shopper user is provided a screen to create a post 101 that describes specifically a product or service they are looking for. The brief post can include product name 102, item category 103, item sub category 104, and further attributes, such as brand, desired color, features, price point, and item condition. The brief post can also include whether there is a preference for purchasing online and/or in store, and location information 105 which corresponds to the specific city or region where the shopper user would like to make the purchase. According to an embodiment, the user can leave personal message along with the post. According to an embodiment, the user can enter multiple locations for the item. The brief post can also include pictures 108 and video 109 that show what the shopper user is looking for (whether it's the exact product or something similar). In one embodiment, a shopper can create static posts with pictures and videos about the products or services they want to buy, and the system instantly post their requests in only one specific location, or multiple locations. According to an embodiment, locations anywhere in the world are provided. •In an alternative embodiment, a user can create their own custom-made video posts about the products or services they want to buy. The videos can be a short clip. In an embodiment, the user can preview the post before publishing it.

A shopper user can publish the post via post button 201 or go back to edit via edit button 202. According to an embodiment of the present disclosure, publishing the post via post button 201 triggers vendor users (such as people and businesses), that have added the category to their customized livestream, to instantly receive the live request and send the shopper their best offers.

Figure 3:
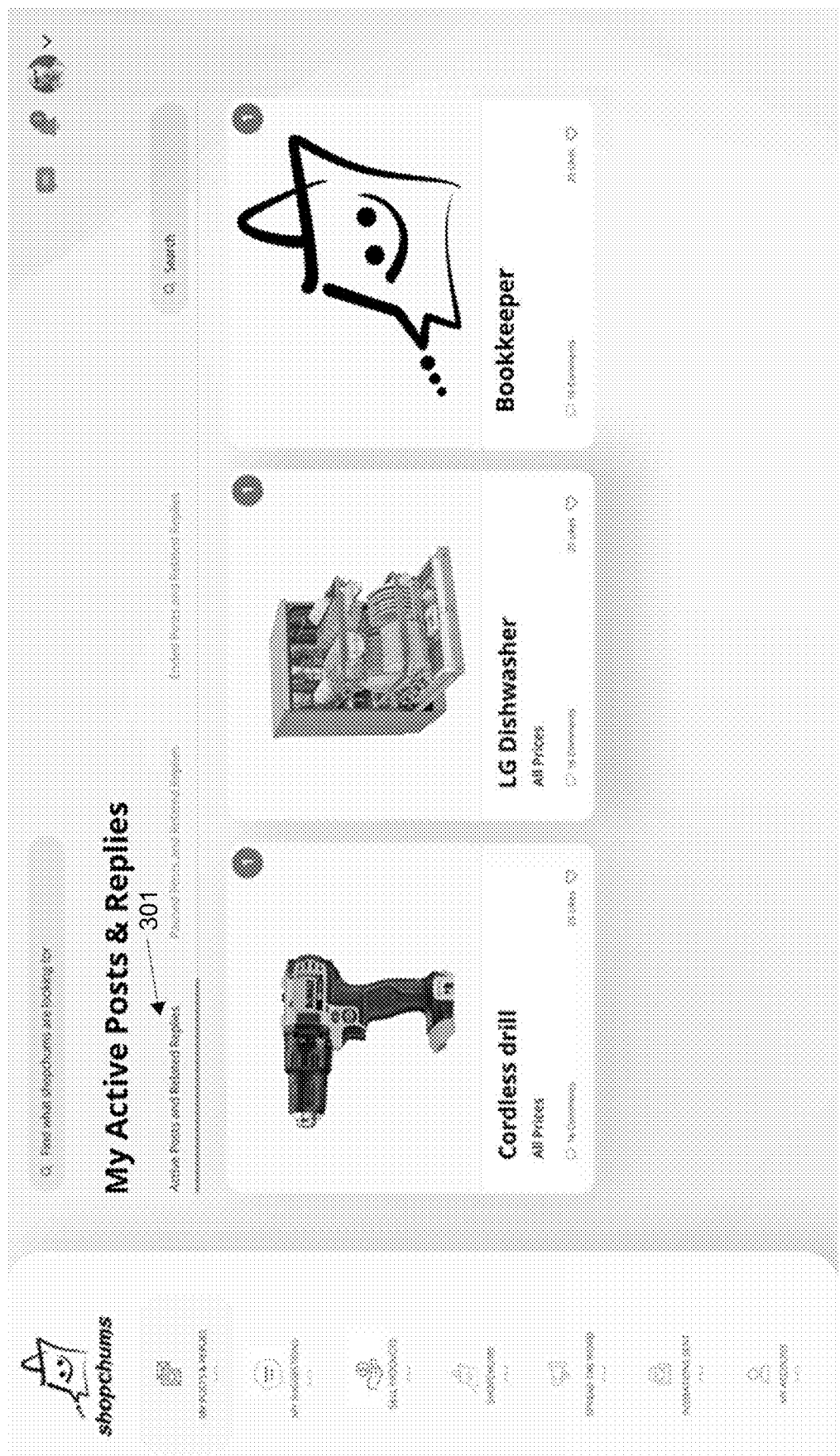
FIG. 3 is a user interface illustrating a screen of all active posts of a user.

FIG. 3 is a user interface illustrating a screen of all active, paused and ended posts of a user. Shopper Users can access to all active posts 301 and view replies for each post. Posts can also be commented and liked by any other users viewing their posts.

According to a further embodiment, using the unique methods disclosed herein, shoppers can search what other fellow shoppers are looking for and send them suggestions as to where they can buy the product or service they are looking for. It can be appreciated that this allows a unique shopping experience where shoppers can search what other fellow shoppers are looking for and send them suggestions as to where they can buy the product or service they are looking for.

Figure 4:
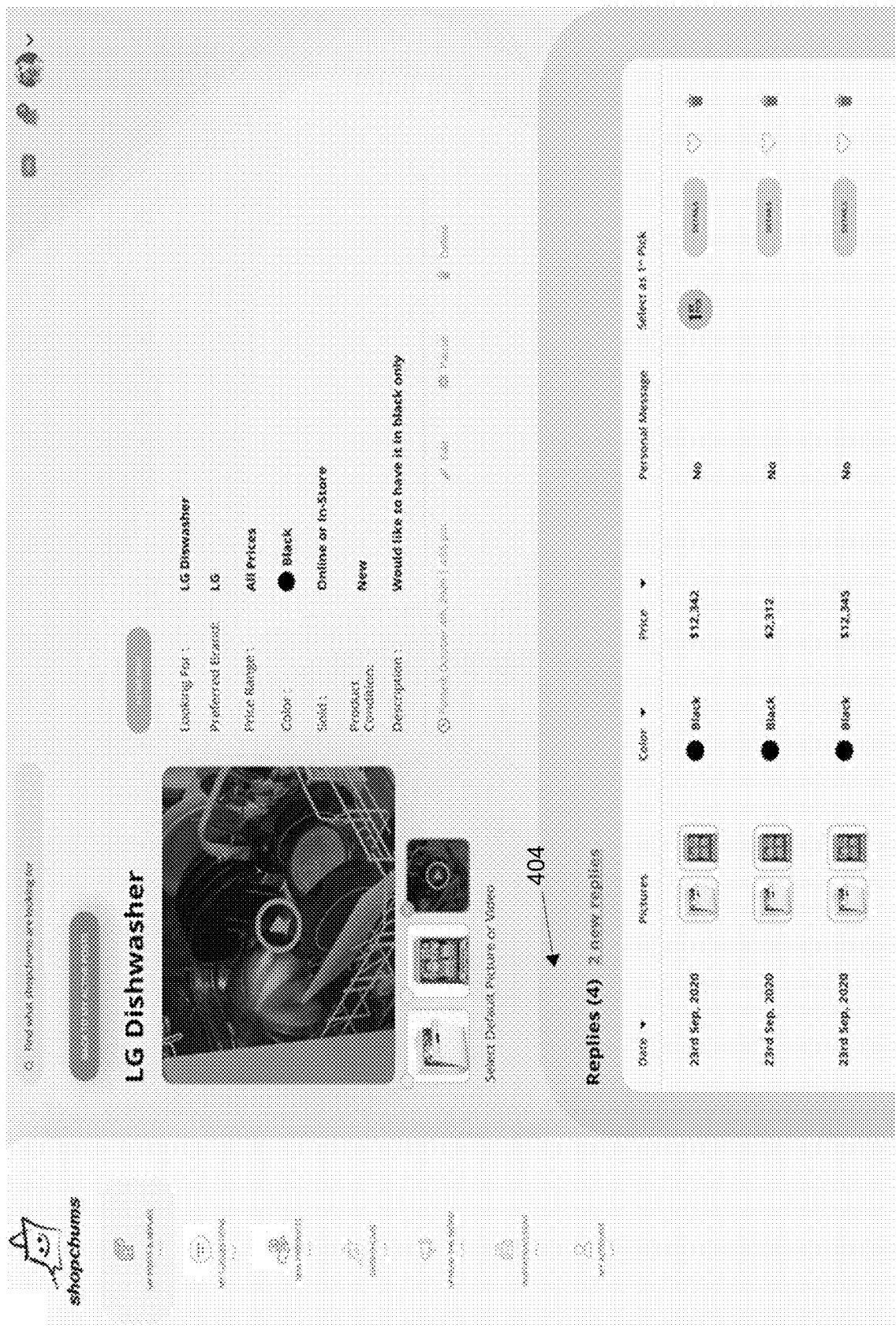
FIG. 4 is a user interface of an active post where a user can view all replies 404 corresponding to that post.

FIG. 4 is a user interface of an active post where a user can view all replies 404 corresponding to that post. A user can also view any personal messages and whether they select any replies as a first pic. Shopper Users receive replies from Vendors as well as suggestions from other Shoppers Users suggesting where to buy what they are looking for.

Figure 5:
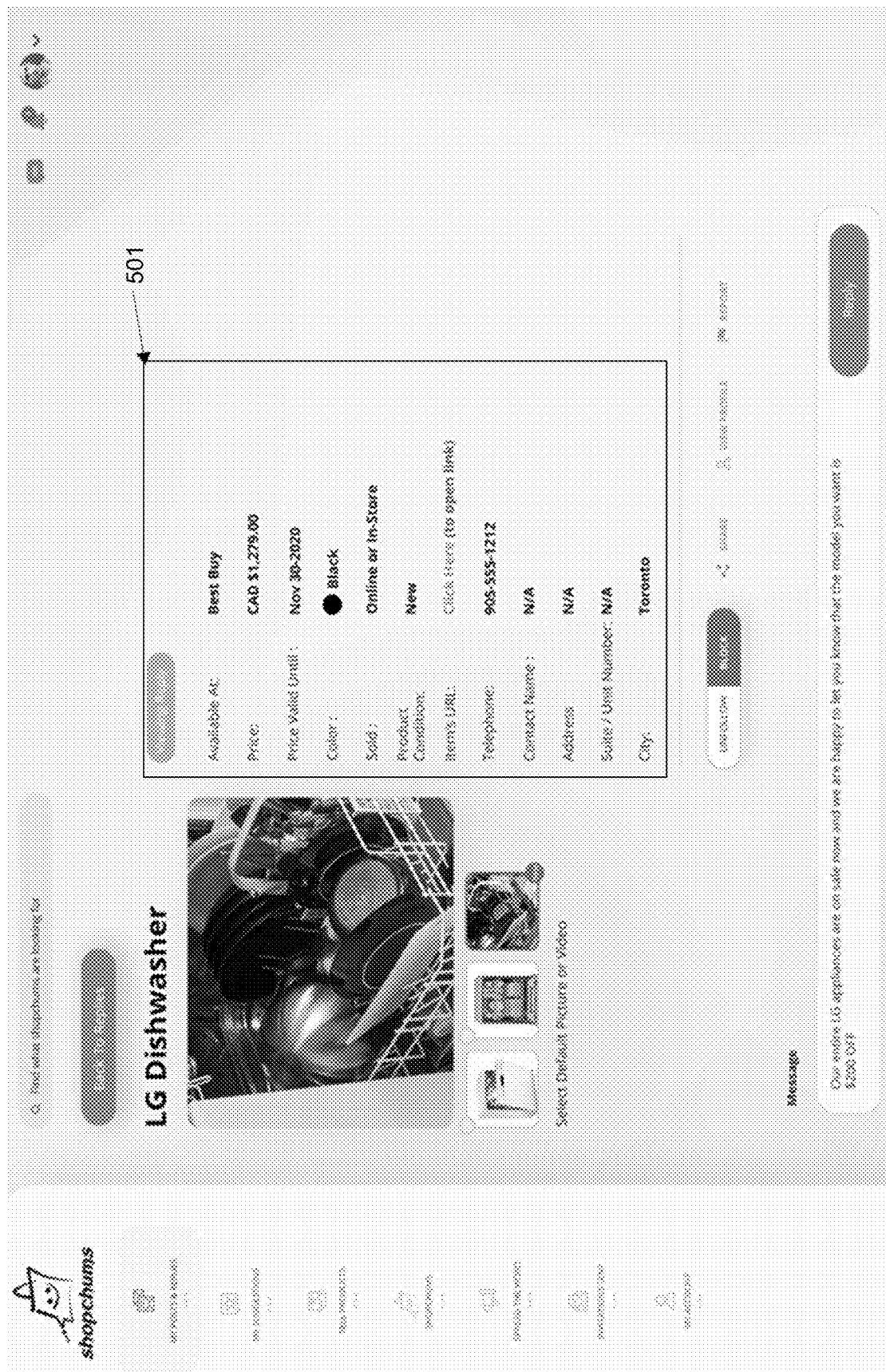
FIG. 5 is a user interface illustrating a reply details page.

FIG. 5 is a user interface of active, paused and ended post where Shopper Users can view item details 501 of each reply. From this screen, the user can also follow, unfollow, and block the person posting the reply.

Figure 6:
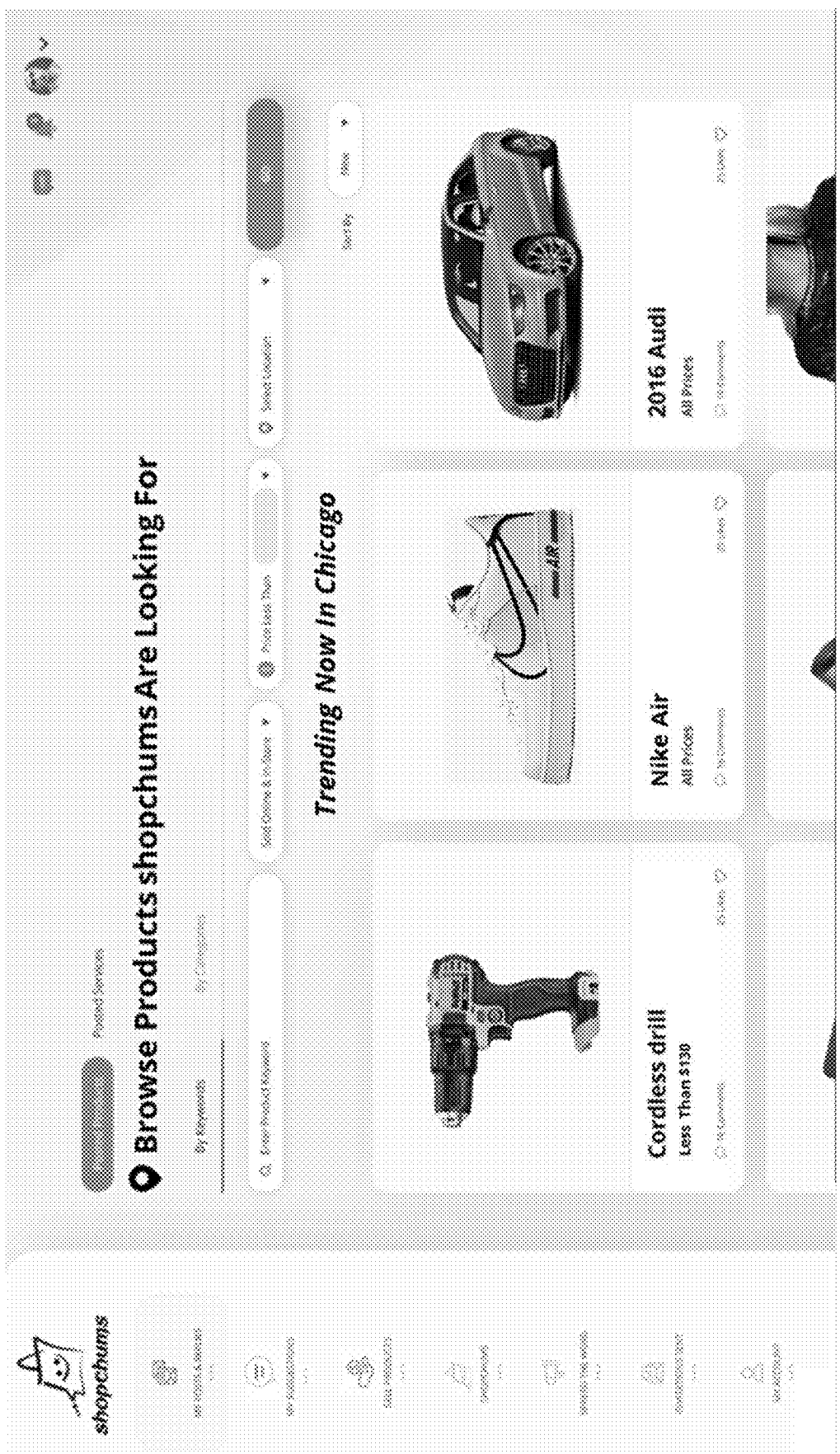
FIG. 6 is a trending products page according to an embodiment of the present disclosure.

FIG. 6 is a trending products page according to an embodiment of the present disclosure. Default page illustrating what products or services shoppers are looking for in a specified location. In one embodiment, the location is automatically specified as the location the user is located in. According to an embodiment, the local trending posts are automatically showed before conducting searches of specific products or services. A user can click on a post fitting the attributes and go to an item description page. Users can also search by attributes including location, price, category, subcategory, or any combination therein or with other attributes.

Figure 7:
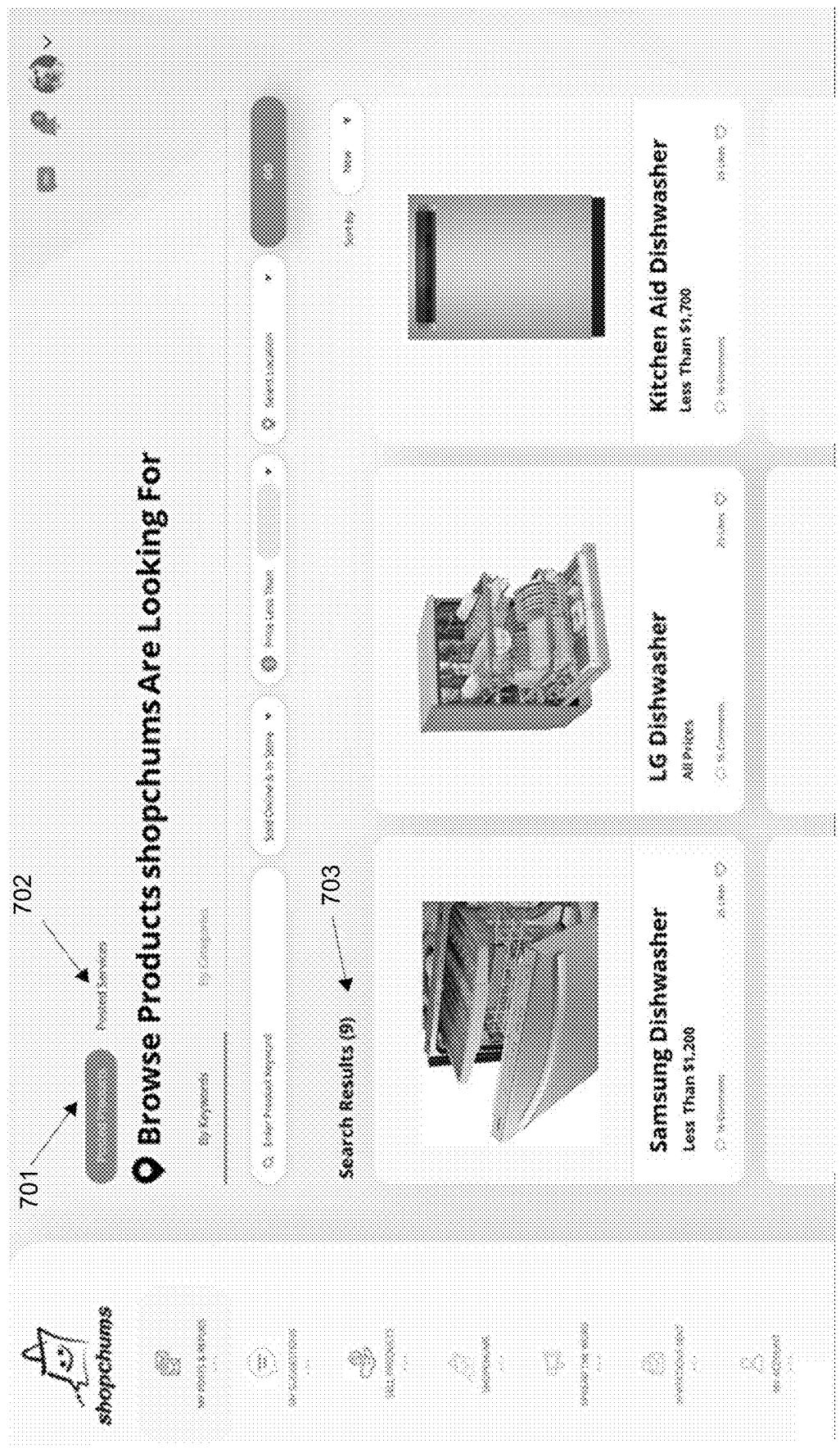
FIG. 7. is user interface illustrating a search results page according to an embodiment of the present disclosure

FIG. 7. is user interface illustrating a search results page according to an embodiment of the present disclosure. Users can view posted goods 701 and posted services 702. Shopper Users and Vendor Users can search and browse what products and services other user Shoppers are looking for in any location in the world. Search results 703 display the results of a search which can be further based on product keywords, pricing, and location filters.

Figure 8:
FIG. 8 is a user interface illustrating an item description page for a wanted product or service according to an embodiment of the present disclosure.

FIG. 8 is a user interface illustrating an item description page according to an embodiment of the present disclosure. Shopper Users and Vendor Users can view post details of what user Shoppers are looking for. According to embodiments of the present disclosure, item description pages can show item request information 803. The item information page can show item information as well as users looking for that item. In addition, other shoppers can send the Shopper User product suggestions that coincide with the details of Shopper User's post. In one embodiment, item description pages include all related comments and likes that other users have posted.

Figure 9:
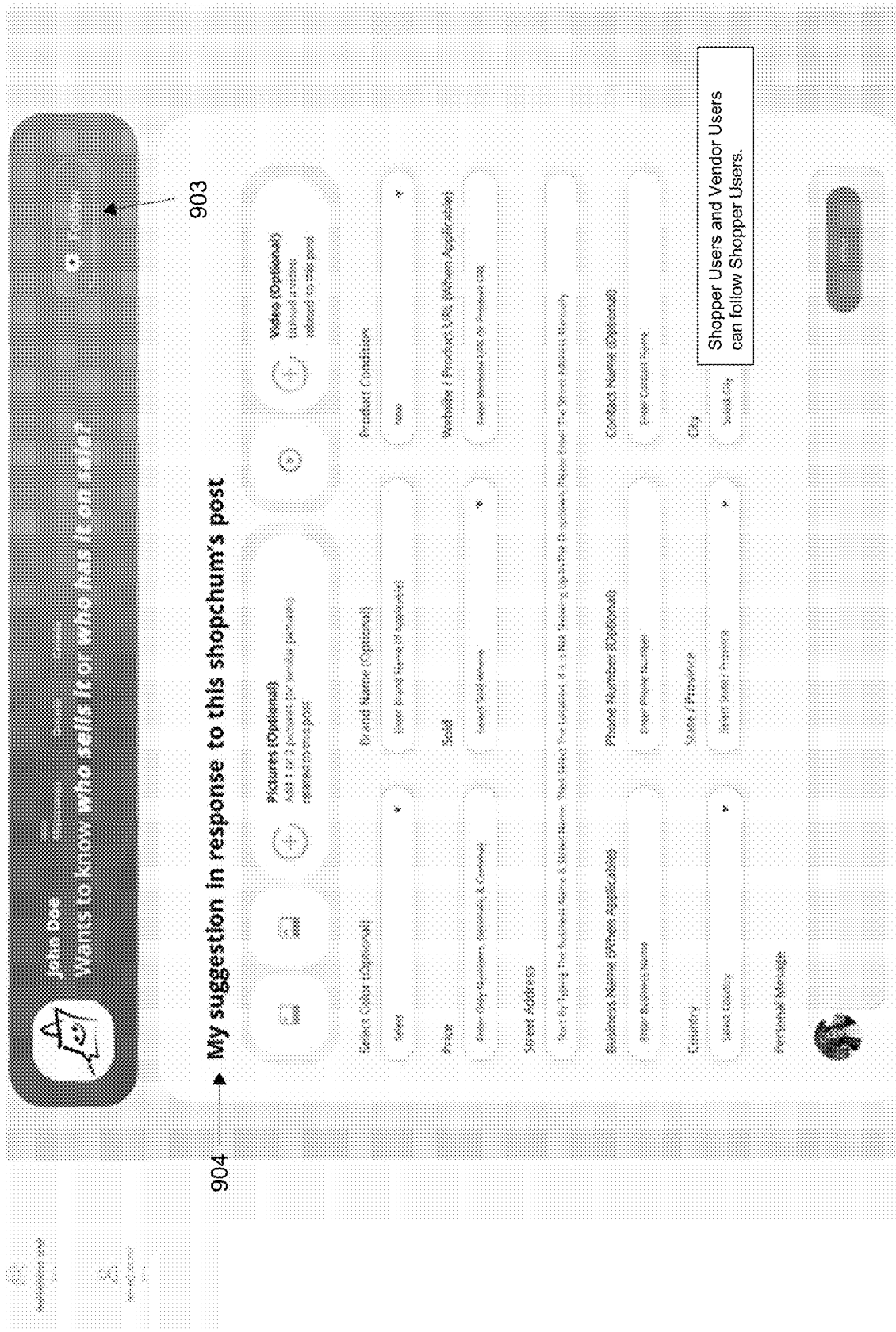
FIG. 9 is a user interface illustrating an item reply interface on an item description page according to an embodiment of the present disclosure

FIG. 9 is a user interface illustrating an item reply interface on an item description page according to an embodiment of the present disclosure. Shopper Users and Vendor Users can view post details of what user Shoppers are looking for. From the search results, Shopper Users and Vendor Users can reply to Shopper Users. Shopper Users and Vendor Users can also follow user Shoppers via follow button 903. Shopper suggestion entry 904 can also include item attributes, posting time, and similar items other users have posted in response. Additionally, people and vendors can submit pictures, video a product name, product URL, price, contact information, and other related item information.

Figure 10:
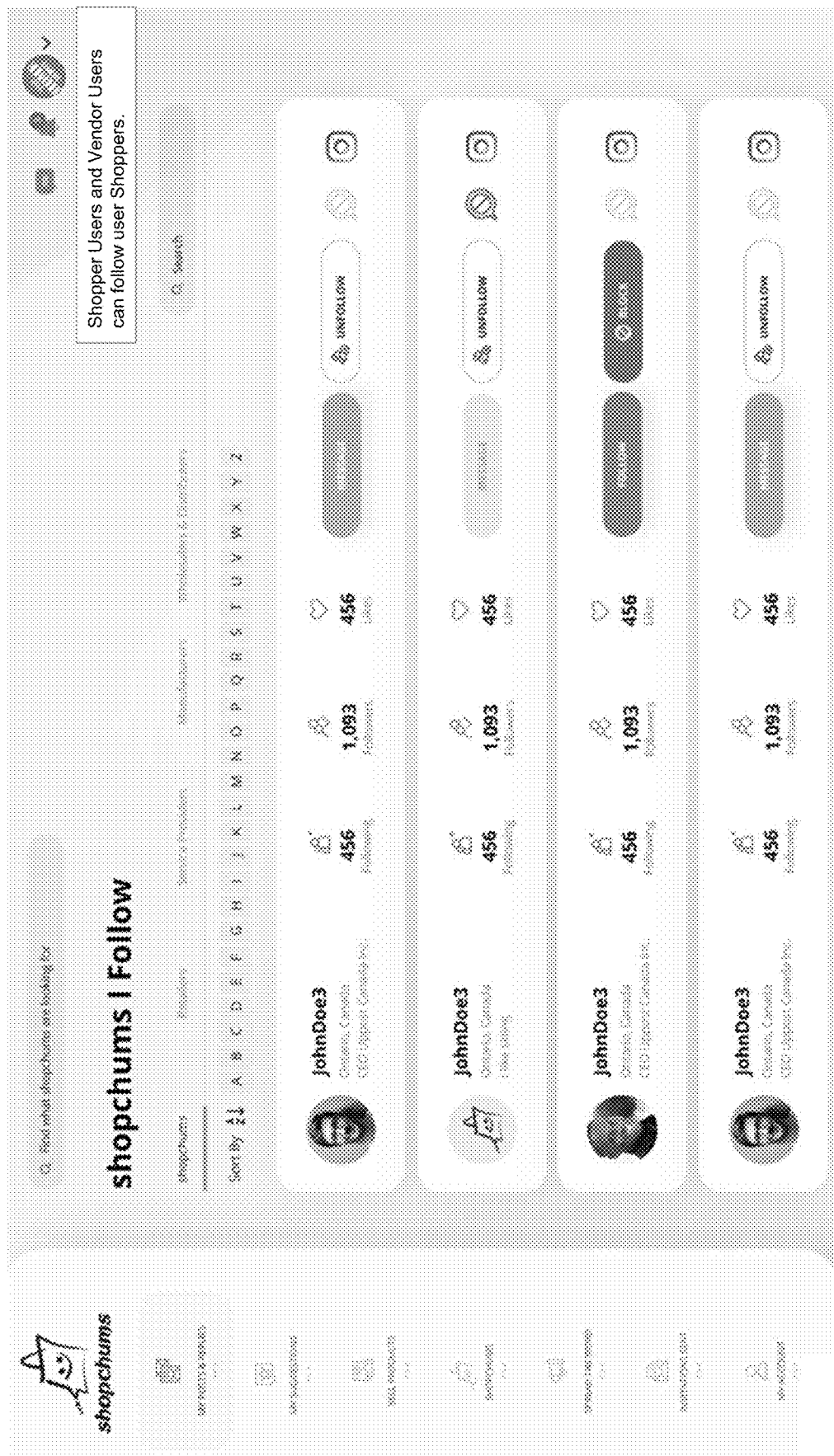
FIG. 10 is a user interface illustrating a follow interface according to an embodiment of the present disclosure
Figure 11:
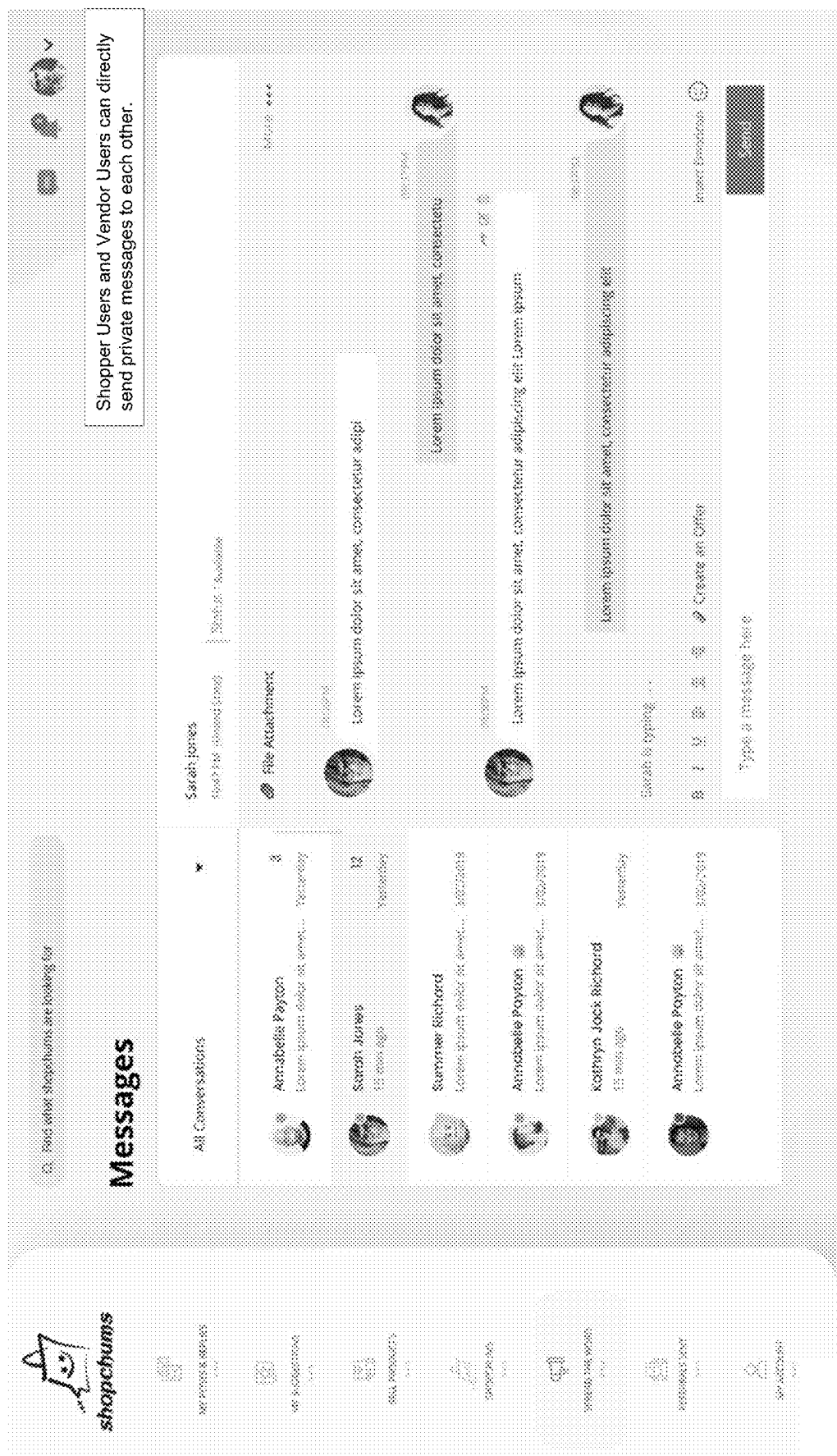
FIG. 11 is a user interface illustrating a messaging interface according to an embodiment of the present disclosure.

FIG. 10 is a user interface illustrating a follow interface according to an embodiment of the present disclosure. Shopper Users and Vendor Users can follow user Shoppers. FIG. 11 is a user interface illustrating a messaging interface according to an embodiment of the present disclosure. Shopper Users and Vendor Users can directly send private messages to each other.

In one embodiment, the shopper user that posted the item can wait for an unlimited amount of time to get any product offers from vendors and suggestions from other shopper users. In an alternative embodiment, the shopper user's product suggestions time out after a set period.

It can be appreciated that this presents a shopper user with product choices in a store or online which best match the shopper user's product or service post at a price that shopper user chooses.

The Shopper User can select favorite offer from amongst the bunch as Shopper User "1st Pick" and then Shopper can immediately unlock the purchasing information for the Shopper User's "1st Pick" as well as all the purchasing information for every other offer made in response to Shopper User's post. If the Shopper User receives multiple offers, then the Shopper User can filter the results using the Shopper User's preferences. When Shopper User selects a "1st Pick", the Shopper User's post will automatically be deactivated and it will no longer be published on the platform. According to embodiments of the present disclosure, product and service offers can come from Vendor Users and suggestions can come from Shopper Users.

Vendor Users and can set up their business profile on the platform. Next, Vendor Users create their own customized Livestream of Shoppers by selecting product categories and sub-categories into which their products and services fall. Next, they select the markets in which they operate in, whether they are single cities, states/provinces, or entire countries. When the Vendor Users finish set up, they have targeted access to shoppers who are posting requests for products and services that are in their preselected product and service categories and sub-categories and who are within the specified market or markets.

Additionally, Shopper Users wishing to sell their pre-owned products can also create their own customized Livestream of Shoppers who are looking to buy the products they want to sell by selecting product categories and sub-categories into which their preowned products fall and then select the markets (single cities, states/provinces, or entire countries) they wish to receive Shoppers requests. Once they sold their product they can simply delete their Livestream and they instantly stop receiving new requests.

Vendor Users are able to respond directly to Shoppers' requests with offers (and as long as posts are active, offers can be edited as many times as they wish). It can be appreciated that this system and method gives Vendor Users unprecedented access Shoppers who are ready to buy their product or service and allow Vendor Users to close sales with Shoppers who might have not seen or known about the product or service availability otherwise, or perhaps did not even know that the business existed. Additionally, it allows Shopper Users wanting to sell their pre-owned products to instantly find and connect with Shoppers who are looking to buy their pre-owned product and send them an offer.

When a Shopper decides that they have received an adequate number of offers, they will be able to make a "1st Pick" selection. Making a "1st Pick" selection will close down the offering process and simultaneously unlock all purchasing information that shoppers need, such as business name, all contact information, store location (if products are being offered in-store) as well as a product link to the business' website, where shoppers can make their purchases.

It can be appreciated that the systems and methods disclosed provide novel methods for Vendor Users to instantly connect directly to shoppers looking to buy their products and services in real-time.

Targeted Livestream Technology

Figure 12:
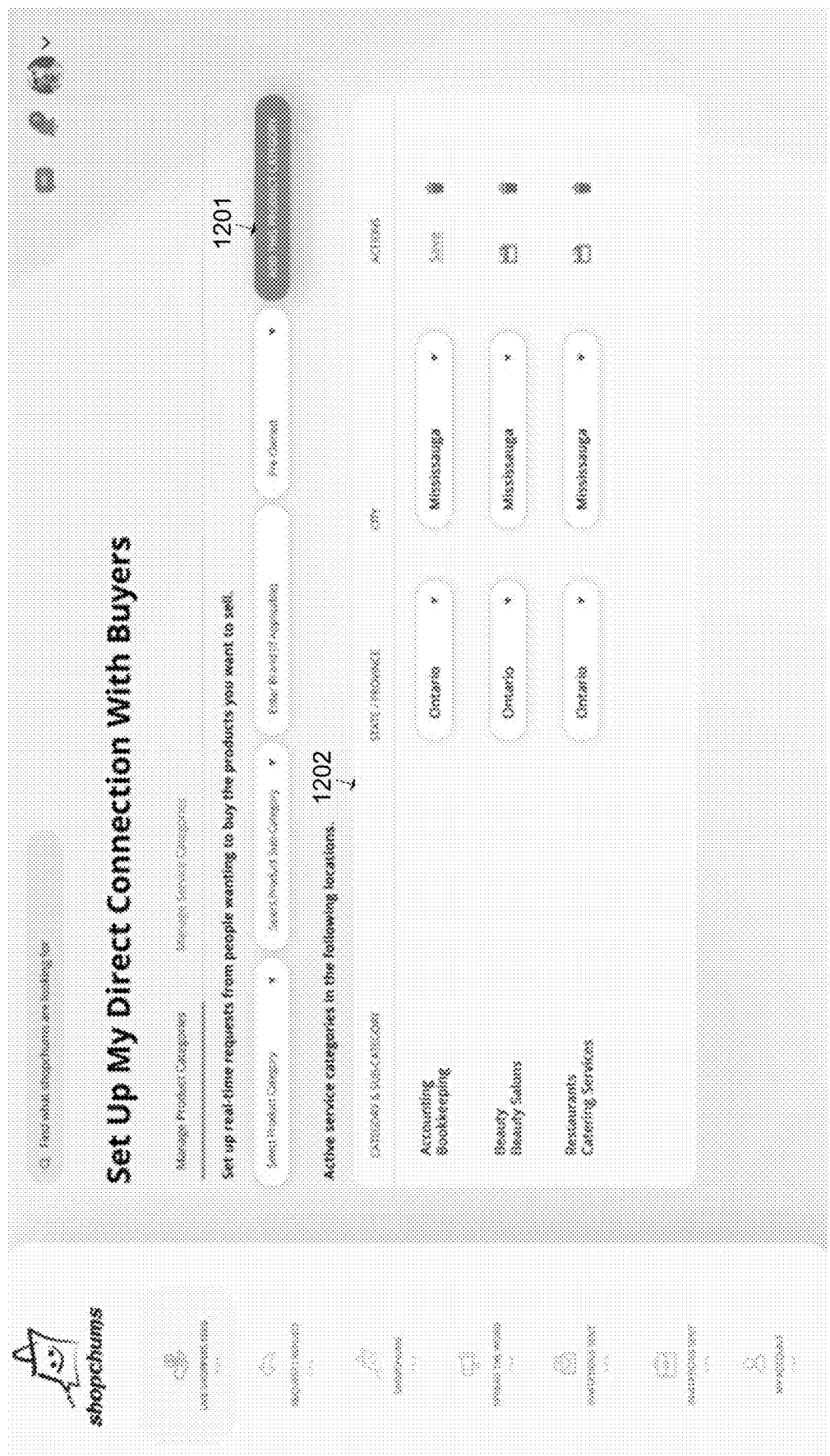
FIG. 12 illustrates a user interface to create a customized Livestream feed.

FIG. 12 illustrates a user interface to create a customized Livestream feed. It can be appreciated that the livestream systems and methods disclosed herein allow both people as well as businesses (retailers, service providers, manufacturers, wholesalers, and distributors) to directly control marketing and making sales by allowing vendors to build a fully personalized direct livestream of ready to buy shoppers. The Livestream can be set up and customized for 1 or multiple categories in 1 or multiple cities or states/provinces or countries.

Shopper Users and Vendor Users can create their own customized Livestream feed of buyers looking to buy what they sell (products and/or services).

Figure 2:
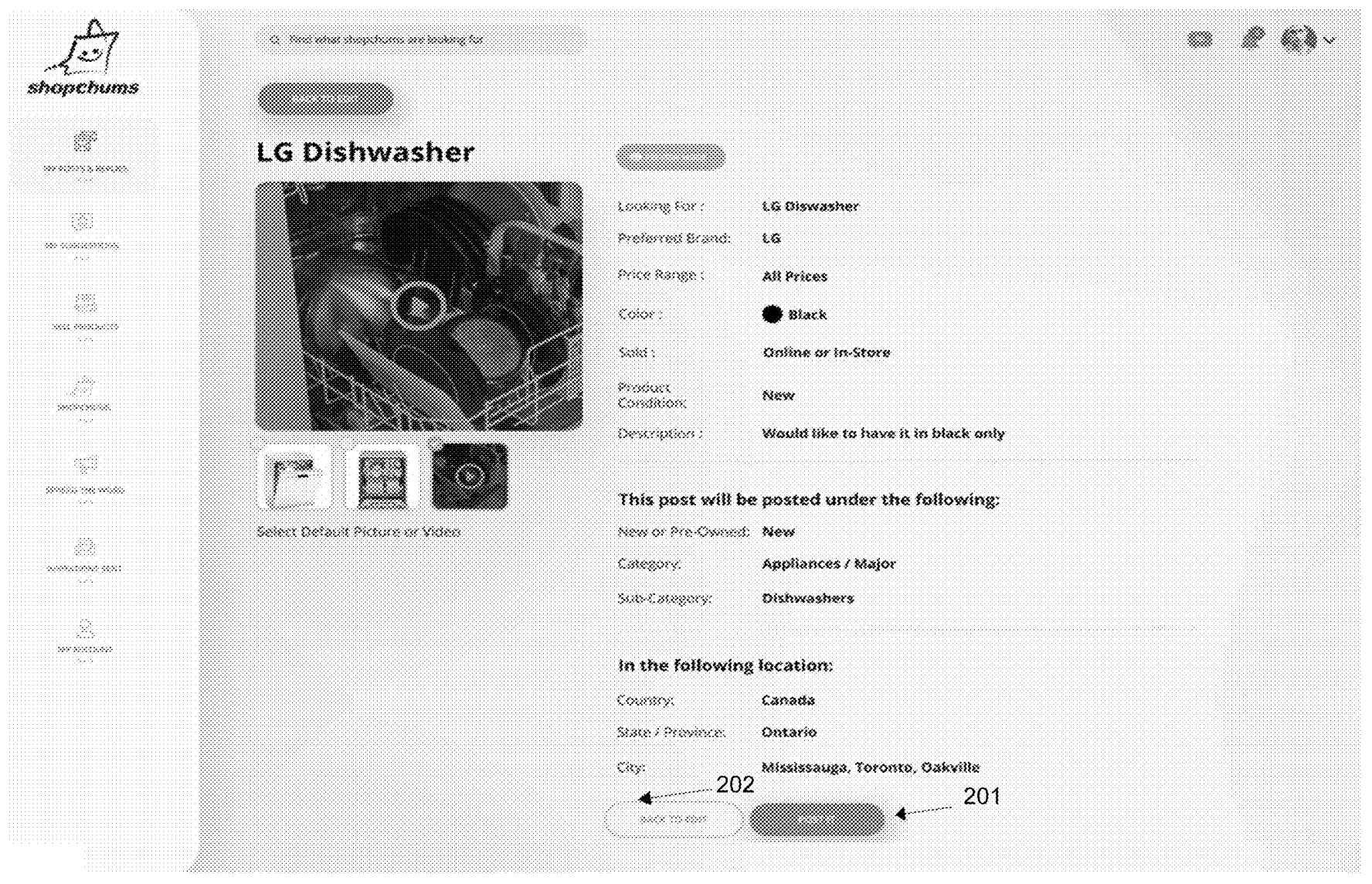

In many ways this works like the reverse of a traditional search engines wherein private individual and commercial sellers search to find the buyers, wherein buyers have already pre-submitted such as in the manner described above and disclosed in FIGS. 1-3. Thus, sellers have access to buyers who are ready to buy items identical or similar to the ones of the sellers.

It can be appreciated that the search system disclosed herein allows vendors and users (i.e. private individuals and commercial sellers) to directly contact the shoppers the very second they post their request, so they never miss the opportunity to make sales.

Private individuals and businesses can find shoppers who are looking to buy the products and services they sell 24/7. They can achieve that by creating their own customized Livestream of shoppers by adding a product category via button 1201. Users can enter product category, product sub-category, brand, and product condition details. According to an embodiment, users can see and edit the locations where each preselected categories and sub-categories are active 1202 from the same screen.

Figure 13:
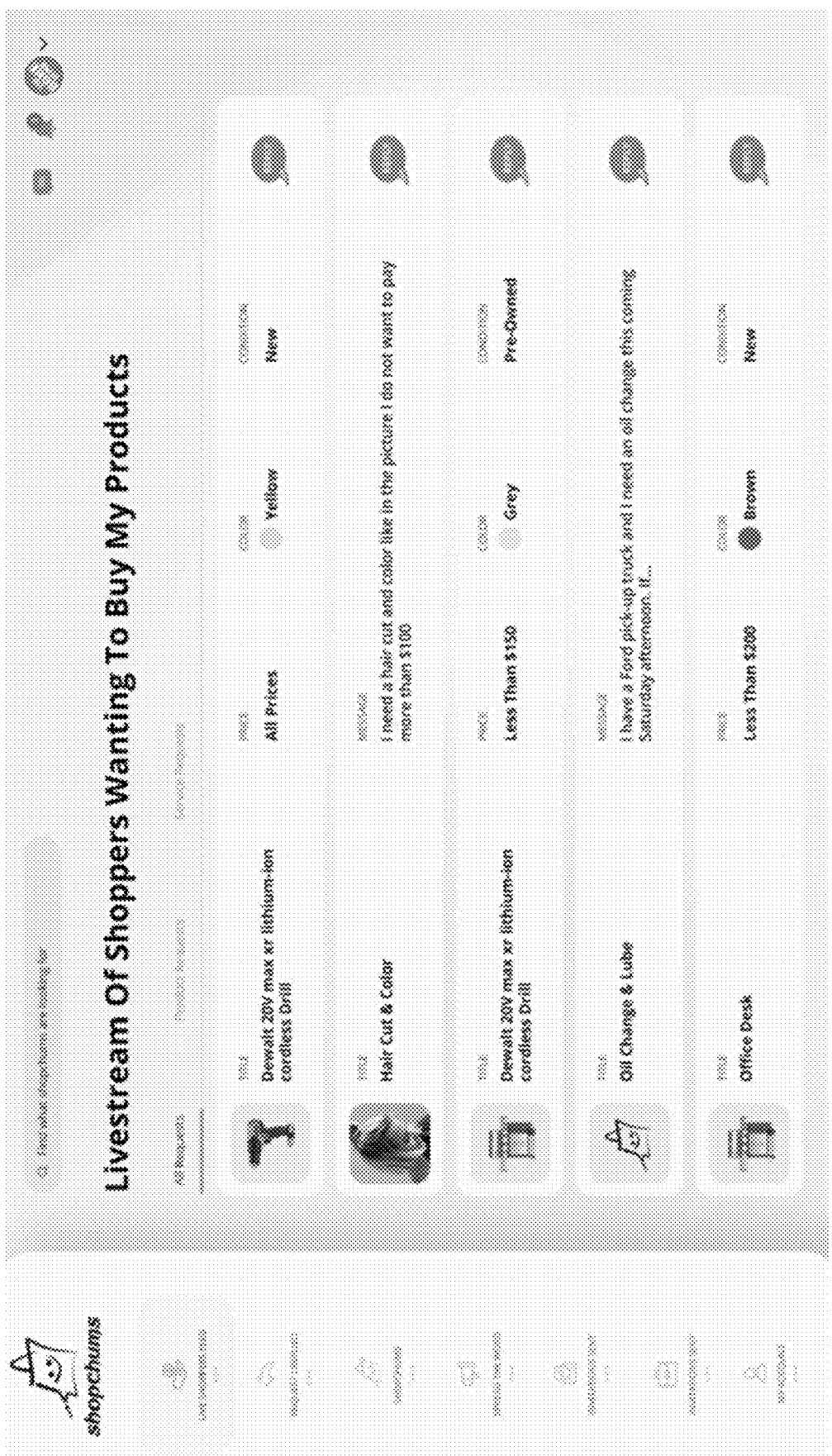
FIG. 13 illustrates a customized Livestream feed according to an embodiment of the present disclosure.

FIG. 13 illustrates a customized Livestream feed according to an embodiment of the present disclosure. Shopper Users and Vendor Users receive (based on their preselected categories and sub-categories) Shoppers requests Live 24/7 and can directly reply to them with their best offer. It can be appreciated that using the unique search system disclosed herein, people and businesses can also search and find shoppers anywhere in the world who are looking to buy the products and/or services they sell, and directly send those shoppers offers.

In a further embodiment, businesses can follow any shoppers as well as other businesses and people and businesses can follow them back as well. This unique technology allows, because of the way the livestream systems and methods presently disclosed, for businesses to directly follow shoppers and always instantly receive all future product or service requests that shoppers will make.

It can be appreciated that the embodiments described herein flip conventional shopping and search engine experience where businesses are first hoping to be found by shoppers looking to buy what they sell and then counting on shoppers to follow their business. That is, the systems and methods of the present disclosure work in reverse and allow businesses to find and follow shoppers.

Figure 14A:
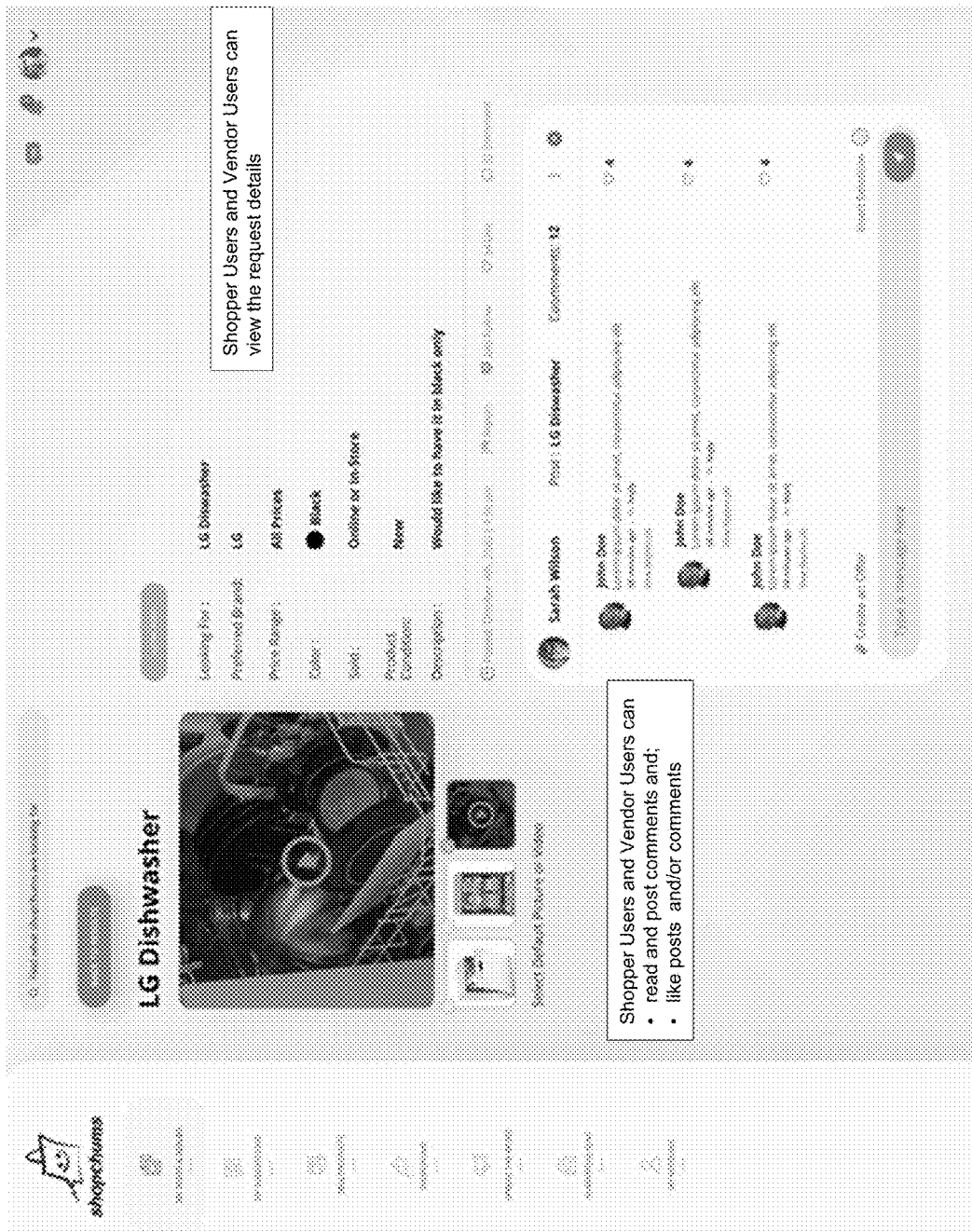
FIG. 14A is a user interface illustrating the top of an item description response page according to an embodiment of the present disclosure.
Figure 14B:
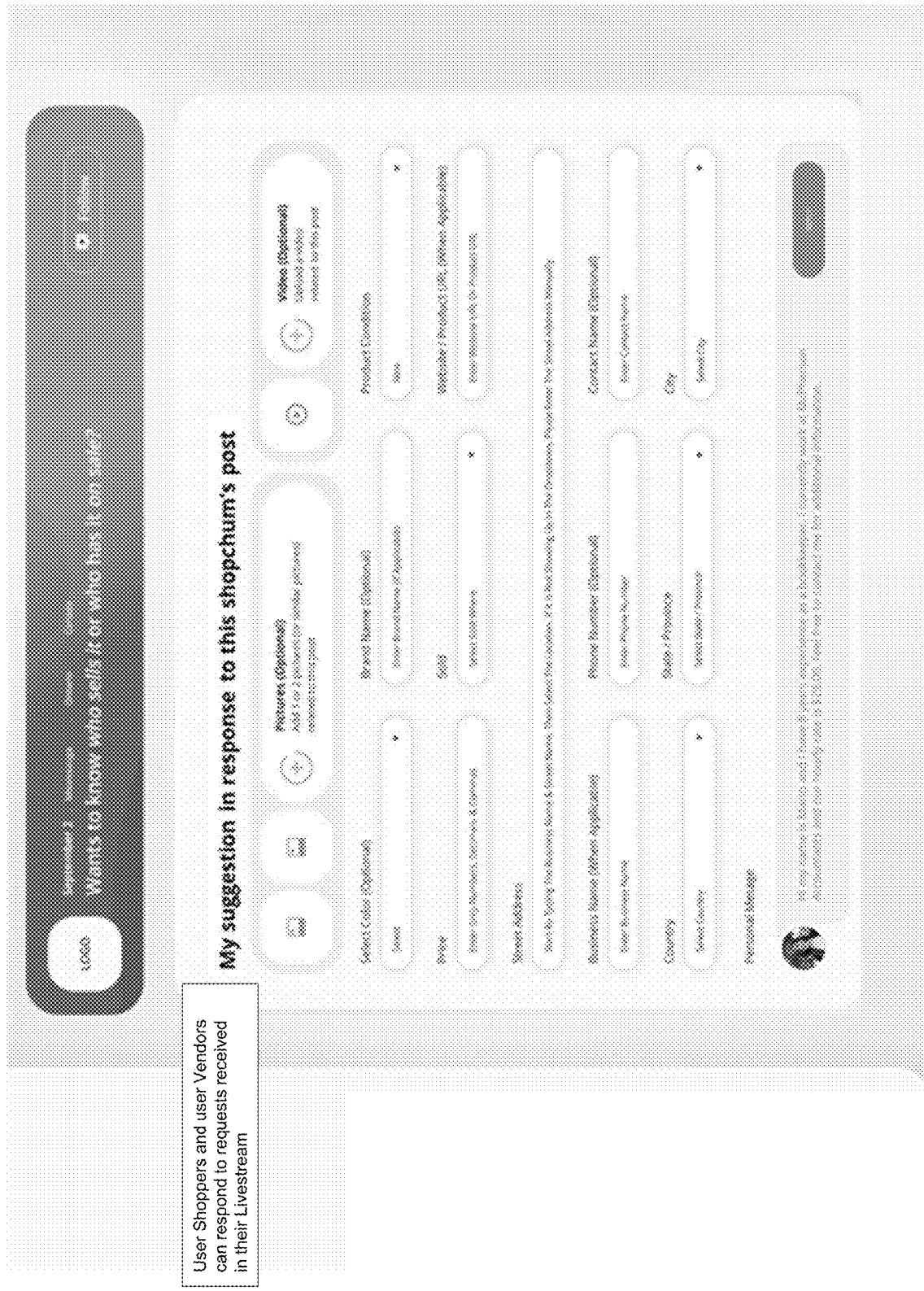
FIG. 14B is a user interface illustrating the top of an item description response page according to an embodiment of the present disclosure.

FIG. 14A is a user interface illustrating the top of an item description and response page according to an embodiment of the present disclosure. On any post they wish to, users can: read details of the shoppers requests, "Like" the static & video posts from the description page of the post, follow the shopper who posted the post, read and post personal comments about the actual post, post personal comments on other people comments. FIG. 14B is a user interface illustrating the bottom of an item description and response page according to an embodiment of the present disclosure. From the same screen, they can send a personal offer with a private message. The offers are sent into a private inbox of the shopper. According to an embodiment, only people receiving the offer can see the offer.

In one embodiment, users have the ability to automate replies for (any) products or services they wish to. As an example, they can opt in and opt out to automate replies on products or services as many times as they wish.

This automation process provides instant gratification to people posting as they get instant responses to their posts.

Figure 15:
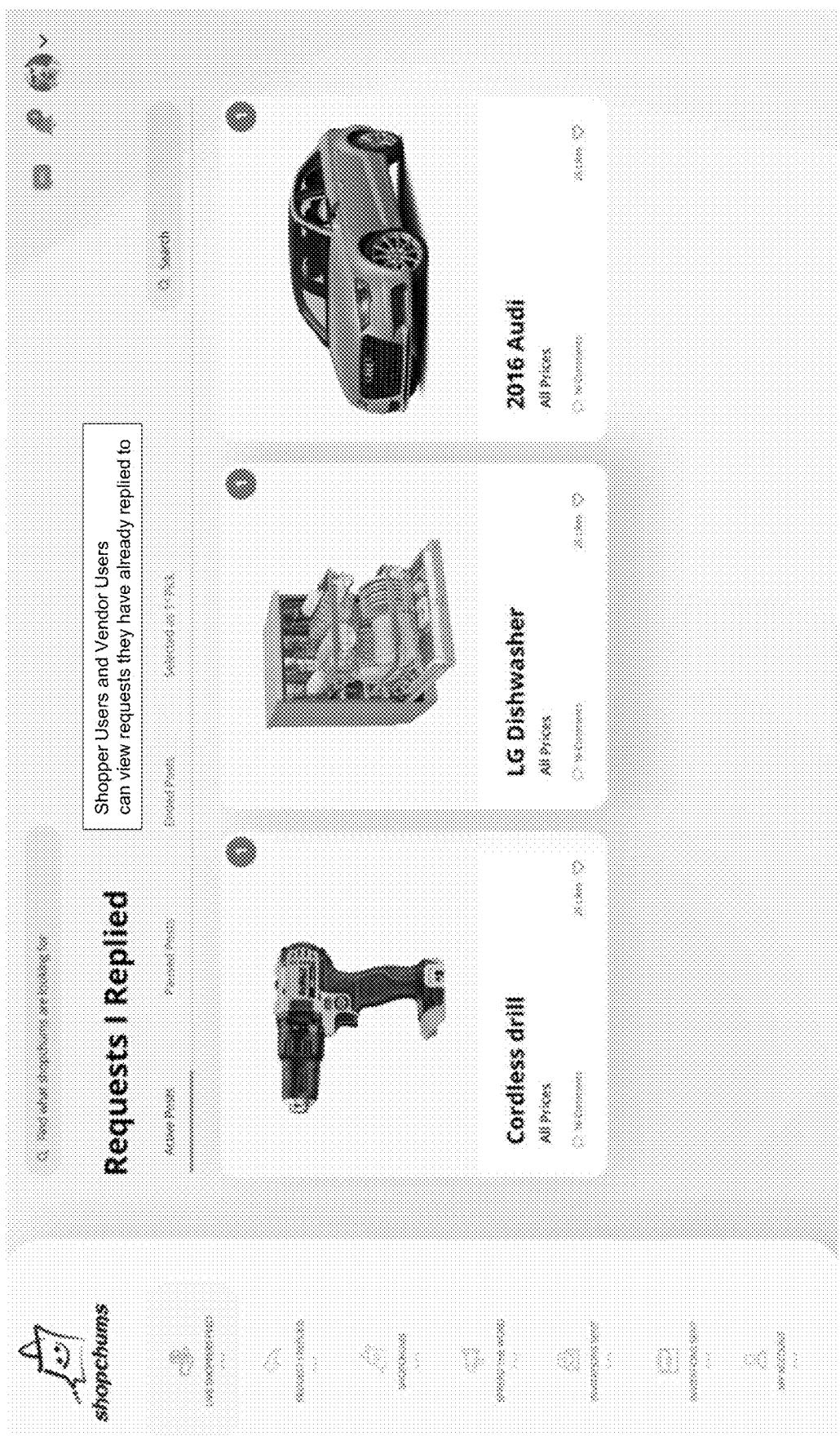
FIG. 15 illustrates a user interface where a vendor can view all items they have replied to FIG. 16 illustrates a user interface where a vendor can edit replies.
Figure 16:
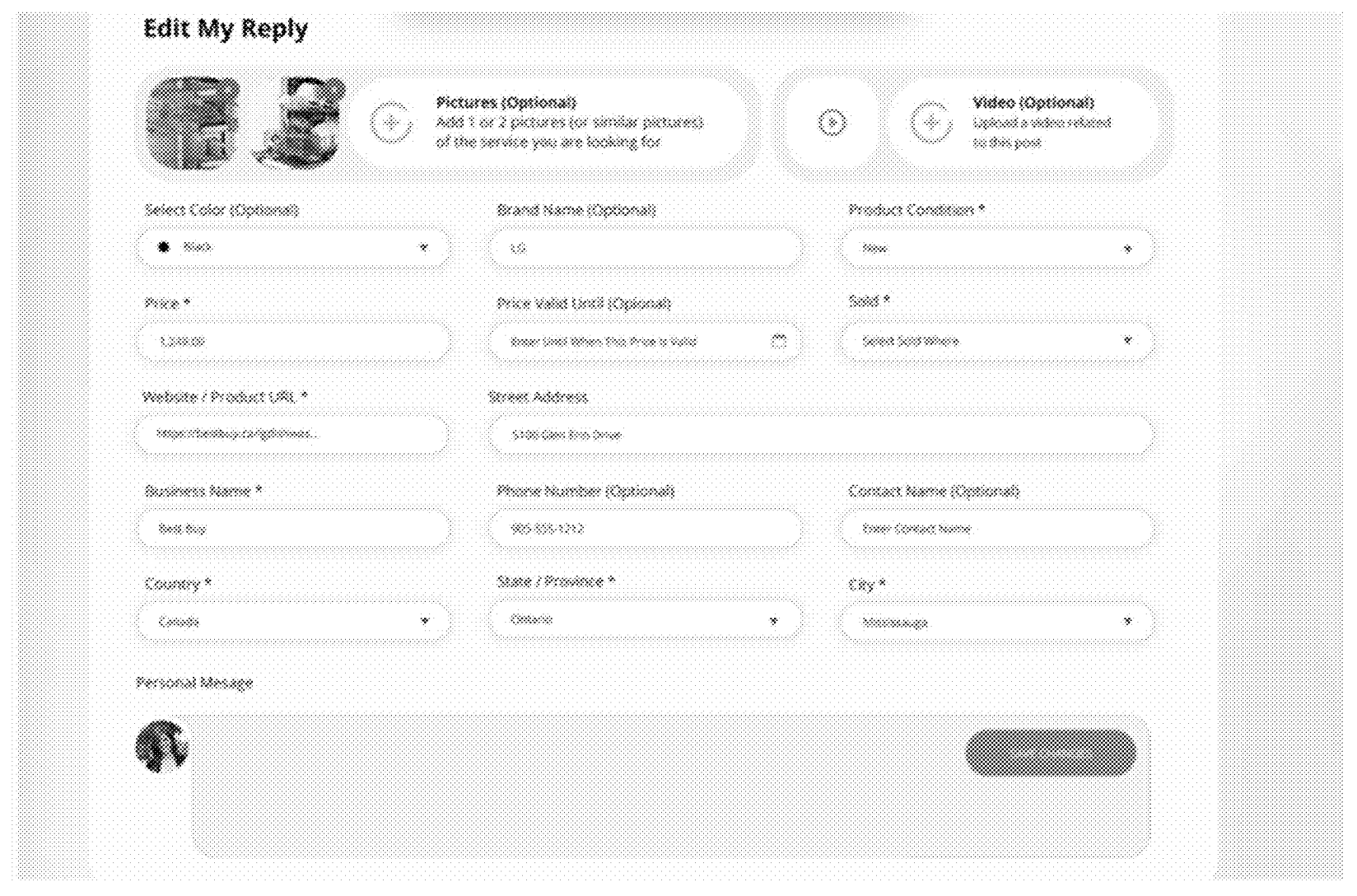
Figure 17:
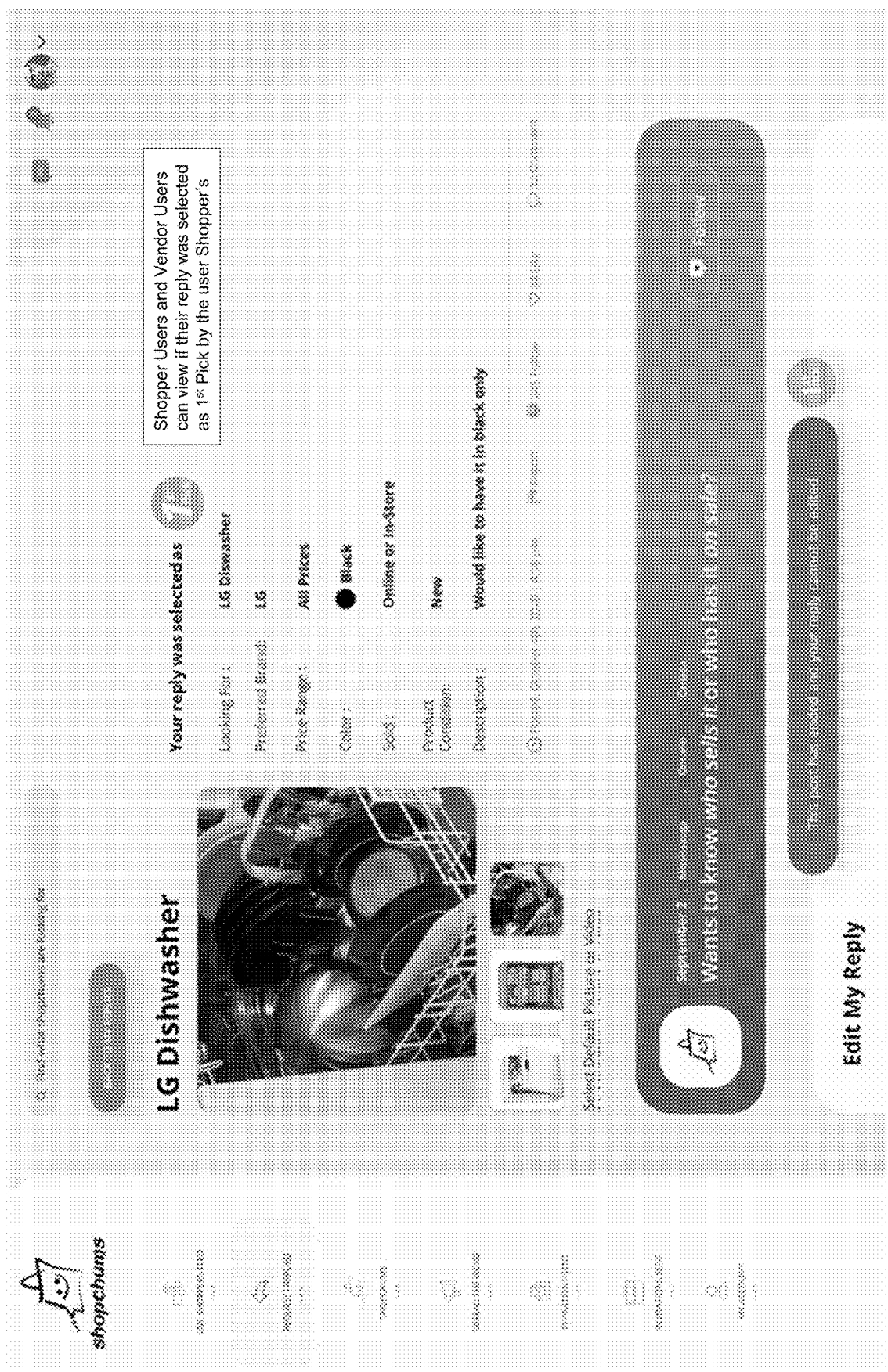
FIG. 17 illustrates a user interface where a vendor can view if their reply was selected as a $1^{st}$ pick by the shopper user.

FIG. 15 illustrates a user interface where a vendor can view all the replies, they have made to shopper user posts 703. FIG. 16 illustrates a user interface where a vendor can edit the replies they have made to Shopper User posts. FIG. 17 illustrates a user interface where a vendor can view if their reply was selected as a $1^{st}$ pick by the shopper user.

Salescast Technology

Embodiments of the present disclosure further disclose a new concept called a Salescast. As vendors will know items that shoppers are looking for, a further embodiment of the present disclosure is providing a Salescast for vendors to contact shoppers regarding particular items.

According to an embodiment, a Salescast is a live feed directly targeted to all users looking for an item. In one embodiment, the Salescast starts at a predetermined date and time and lasts for a predetermined amount of time.

For example, the posting technology presently disclosed above herein keeps track of users who are looking for a specific item, as an example, a specific vehicle. That is, vendors have access to all shoppers (in locations throughout the world) who are currently looking for that specific vehicle. Embodiments of the present disclosure allow vendors to make a Live Salescast to people looking to buy that vehicle.

In one embodiment, a vendor is provided the option to make a Salescast for a particular item in a location of their choice anywhere in the world, from 1 city to multiple cities, states/provinces or countries. This triggers a "Salescast invitation" to all shoppers who are looking for that item (within the location(s) selected by the vendor) and invite them to attend the Salescast. In one embodiment, the Salescast can be sent to people looking for similar items (such as recommended items) in addition to those looking for the exact item. In a further embodiment, after the Salescast is set-up, once another user post a new post for the similar item they will automatically receive an invitation to attend the Salescast and they will be able to opt in to that said Salescast.

In a further embodiment, the system notifies a vendor of all the people who have indicated that they will attend the Salescast. In a further embodiment, the Salescast notification includes a breakdown of how many people for each location in the world. An anticipated price for a Salescast is based on the number of reservations to attend the Salescast within the selected location(s), and a final price is finalized after the Salescast, based on the actual number of people who actually attended the Salescast. It can be appreciated that this provides businesses with a targeted customers attendance accuracy at all-time 100% of the time.

Thereafter, the vendor can record their Salescast and the server network device can broadcast it LIVE at the selected time of the day. In a further embodiment, a vendor can change the selected time of a Salescast.

In a further embodiment, whatever offer is presented by any company is automatically sent to all vendors around the world that are selling the promoted item in the Salescast. For example, if BMW head office schedules a Salescast to offer a promotion for their BMW 3 series, then the system will send the Salescast link with the date and time, to every dealer selling the BMW 3 series within the location(s) of the Salescast. Thereafter, all local dealers will be able to send an offer (based on the head office's offer in the Salescast) to the local people who attended the manufacturer head office Salescast.

In a further embodiment, midstream and downstream vendors (i.e. dealers selling the BMW 3 series) are provided the opportunity to do a local Salescast directly after a head office/manufacturer Salescast. This allows a local dealer to do a LIVE Salescast for the local shoppers who just attended the Salescast of the Head Office. In a further embodiment, the Salescast is offered on a per attendee price basis and it is offered on an exclusive basis to only one of the local dealers and only that dealer will be able to do the Salescast (immediately after the head office/manufacturer) in their respective city and we will offer that to one dealer in every city around the world where the head office/manufacturer conducted the Salescast.

As soon as the Salescast for the BMW 3 series ends, the very next second thereafter, there will be new posts from OTHER people looking for a BMW 3 series. So, the process above is never ending as there will ALWAYS be new posts for BMWs—new customers—so it can be repeated daily or multiple times per day as businesses will ONLY pay for people who actually attend THE Salescast, so it is very affordable—targeted and profitable! Local dealers can also create their own Salescast at any time even if the head office does not create their own Salescast.

Now, as an example, at 4:00 PM local time (in all time zones), an unlimited of LIVE Salescasts can happen simultaneously at the very same time as it is fully based on people posts so some will watch;

BMW 3 series
others the BMW 5 series
others the BMW 7 series
others all other cars make and models
others toilet paper
others living room sets
others MAC mascara and so on and on.

Figure 18:
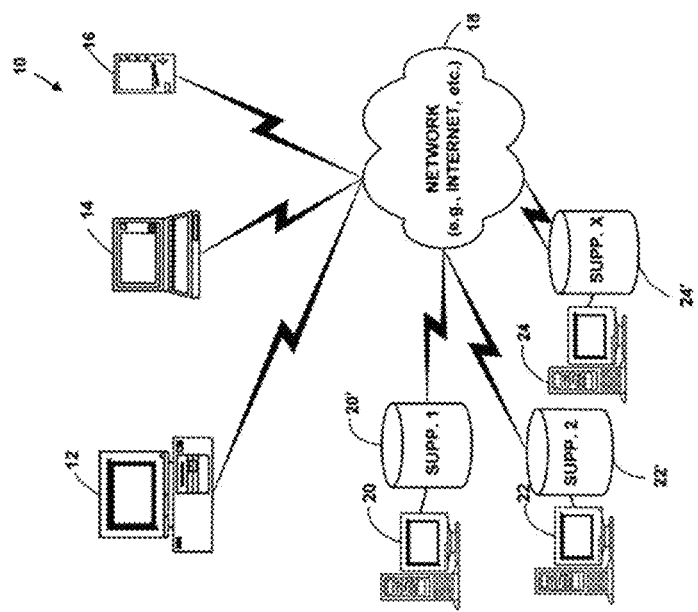
FIG. 18 is an architecture diagram according to an embodiment of the present disclosure.

FIG. 18 is an architecture diagram. The user interfaces, methods, and systems disclosed can be implemented via a shopping system 10 includes one or more client network devices 12, 14, 16 (only three of which are illustrated). The client network devices 12, 14, 16 include, but are limited to, personal computers, wireless telephones, personal information devices, personal digital assistants, hand-held devices, network appliances, and other types of electronic devices. However, the present invention is not limited to these devices and more, fewer or equivalent types of client electronic devices can also be used. The client network devices 12, 14, 16 can represent shoppers as well as vendors and are in communications with a computer network 18 (e.g., the Internet, intranet, etc.). In one embodiment, vendors are manufactures of products.

The communication includes, but is not limited to, communications over a wire connected to the client network devices, wireless communications, and other types of communications. Plural server network devices 20, 22, 24 associated with one or more associated databases include reservation and/or pricing information for goods that may be supplied by plural vendors 20', 22', 24'.

An operating environment for components of the electronic option system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

Modifications, additions, or omissions may be made to the systems, apparatuses, and/or methods described herein without departing from the scope of the disclosure. For example, various components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for locating, reserving and purchasing goods and services, comprising:
   providing, by a server network device via a computer network to a shopper user utilizing a shopper client network device, a graphical user interface ("GUI"), wherein the server network device comprises a processing system with at least one high speed Central Processing Unit ("CPU") and a memory;
   displaying, by the shopper client network device, the GUI to the shopper user;
   receiving, by the shopper user via the GUI displayed by the shopper client network device, a post from the shopper client network device, wherein the post contains selections by the shopper user including item attributes and a particular location corresponding to a specific city or region where the shopper user would like to make a purchase;
   in response to receiving the post, transmitting, by the shopper client network device, the post to the server network device via the computer network;
   receiving and publishing, by the server network device, the post to a livestream interface of the server network device using the CPU;
   in response to receiving the post, automatically transmitting by the server network device, an electronic message to businesses that have categories associated with the item attributes, wherein the electronic message comprises the post;
   enabling, by the livestream interface, other shopper users and any business to search for the published post, comment on the published post, and send messages to the shopper user suggesting where to buy what they are looking for;
   in response to the published post receiving comments, replies, or likes, automatically generating, updating, and displaying, by the server network device, an updated livestream interface to include the received comments, replies, and/or likes;
   receiving, by the server network device, one or more offers from the businesses in response to the electronic message, wherein the offer is the lowest price for an item containing the item attributes each business is willing to sell the item;
   presenting, by the GUI of the shopper client network device, the one or more offers from the businesses and presenting any additional offers from the received comments and replies;
   receiving, via the GUI of the shopper client network device, a selection of a presented offer from the shopper user, wherein the selection comprises a top choice;
   in response to the selection, automatically deactivating the post such that the post is no longer published and is no longer searchable and simultaneously updating the GUI of the shopper client network device, wherein the updated GUI displays unlocked purchasing information for each of the presented offers including a sellers name, contact information, and a link to a product website;
   tracking, by the server network device, all users looking for a specific item based on posts and searches of each user;
   enabling, by the server network device, a vendor to directly target users looking for the specific item via a live feed, wherein the live feed is for the specific item, targets users in a particular location, and the live feed is a recording that is broadcast live at a predetermined date and time and lasts for a predetermined amount of time;
   transmitting, by the server network device, an invitation to attend the live feed to the targeted users, wherein the targeted users are some or all the tracked users looking for the specific item;
   in response to receiving, by the server network device from a non-targeted user computer, a new post associated with the specific item prior to the predetermined date and time, automatically transmitting an invitation to attend the live feed to the non-targeted user computer; and
   broadcasting, by the server network device, the live feed at the predetermined date and time.

2. The method of claim 1, further comprising providing an option to reserve and purchase the item containing the item attributes found in at least one of the received offers.

3. The method of claim 2, wherein the reserving and purchasing can be either public or private.

4. The method of claim 1, further comprising providing, by the server network device, a user interface to a third party shopper enabling the third party shopper to send the shopper user product suggestions that coincide with the details of shopper user's post.

5. A non-transitory machine-readable storage medium having stored thereon a computer program for product location assistance in a retail location, said computer program comprising a set of instructions for causing a machine to perform the steps of:

providing, by a server network device via a computer network to a shopper user utilizing a shopper client network device, a graphical user interface ("GUI") of the shopper client network device to create a post containing item attributes and a particular location selected by the shopper user, wherein the server network device contains a processing system with at least one high speed Central Processing Unit ("CPU") and a memory;

displaying, by the shopper user client network device, the GUI to the shopper user;

receiving by the shopper user, via the GUI displayed by the shopper client network device, a post from the shopper client network device, wherein the post contains selections by the shopper user including item attributes and a particular location corresponding to a specific city or region where the shopper user would like to make a purchase;

in response to receiving the post, transmitting, by the shopper client network device, the post to the server network device via the computer network;

receiving and publishing, by the server network device, the post to a livestream interface of the server network device using the CPU;

in response to receiving the post, automatically transmitting, by the server network device, an electronic message to businesses that have categories associated with the item attributes, wherein the electronic message comprises the post;

enabling, by the livestream interface, other shopper users and any business to search for the published post, comment on the published post, and send messages to the shopper user suggesting where to buy what they are looking for;

in response tothe published post receiving comments, replies, or likes, automatically generating, updating, and displaying, by the server network device, an updated livestream interface to include the received comments, replies, and/or likes;

receiving, by the server network device, one or more offers from the businesses in response to the electronic message, wherein the offer is the lowest price for an item containing the item attributes each business is willing to sell the item;

presenting, by the GUI of the shopper client network device, the one or more offers from the businesses and presenting any additional offers from the received comments and replies to the shopper user;

receiving, via the GUI of the shopper client network device, a selection from the shopper user, wherein the selection comprises a top choice;

in response to the selection, automatically deactivating the post such that the post is no longer published and is no longer searchable and simultaneously updating the GUI of the shopper client network device wherein the updated GUI displays unlocked purchasing information for each of the presented offers including a sellers name, contact information, and a link to a product website;

tracking, by the server network device, all users looking for a specific item based on posts and searches of each user;

enabling, by the server network device, a vendor to directly target users looking for the specific item via a live feed, wherein the live feed is for the specific item, targets users in a particular location, and the live feed is a recording that is broadcast live at a predetermined date and time and lasts for a predetermined amount of time;

transmitting, by the server network device, an invitation to attend the live feed to the targeted users, wherein the targeted users are some or all the tracked users looking for the specific item;

in response to receiving, by the server network device from a non-targeted user computer, a new post associated with the specific item prior to the predetermined date and time, automatically transmitting an invitation to attend the live feed to the non-targeted user computer; and broadcasting, by the server network device, the live feed at the predetermined date and time.

6. The medium of claim 5, wherein the item attributes include desired color, features, brand, price point, and desired location selected by the shopper user.

7. The medium of claim 6, further comprising providing an option to reserve and purchase the item containing the item attributes found in at least one of the received offers.

8. The medium of claim 7, wherein the reserving and purchasing can be either public or private.

9. The medium of claim 8, further comprising providing, by the server network device, a user interface to a third party shopper enabling the third party shopper to send the shopper user product suggestions that coincide with the details of shopper user's post.

* * * * *